United States Patent
Johnson et al.

(10) Patent No.: US 6,179,181 B1
(45) Date of Patent: Jan. 30, 2001

(54) BIKE TRANSPORT RACK

(75) Inventors: Roland E. Johnson; Douglas M. Johnson, both of Byron Center, MI (US)

(73) Assignee: Bara Technologies, Inc., Grand Rapids, MI (US)

( * ) Notice: Under 35 U.S.C. 154(b), the term of this patent shall be extended for 0 days.

(21) Appl. No.: 09/274,563

(22) Filed: Mar. 23, 1999

(51) Int. Cl.[7] .................................................... B60R 9/10
(52) U.S. Cl. ..................... 224/405; 224/561; 224/924; 296/43; 211/20
(58) Field of Search .................... 224/309, 321, 224/319, 402, 403, 405, 925, 924, 560, 561; 296/43; 211/20, 21, 22

(56) References Cited

U.S. PATENT DOCUMENTS

| | | |
|---|---|---|
| 2,214,177 | 9/1940 | Raybould . |
| 2,904,379 | 9/1959 | Nelson . |
| 3,333,873 | 8/1967 | Triplett . |
| 3,912,139 * | 10/1975 | Bowman ........................... 224/924 X |
| 4,042,275 * | 8/1977 | Glassmeyer et al. .................. 296/43 |
| 4,371,082 * | 2/1983 | Hostert et al. ......................... 211/22 |
| 4,728,017 * | 3/1988 | Mullican ............................... 224/404 |
| 4,756,639 | 7/1988 | Hoshino . |
| 4,997,304 | 3/1991 | Choy . |
| 5,092,504 * | 3/1992 | Hannes et al. ........................ 224/403 |
| 5,127,564 * | 7/1992 | Romero ................................ 224/403 |
| 5,476,349 * | 12/1995 | Okland ............................... 296/43 X |
| 5,553,762 * | 9/1996 | Brown .............................. 224/405 X |
| 5,560,666 | 10/1996 | Vieira et al. . |
| 5,611,472 * | 3/1997 | Miller ............................... 224/405 X |
| 5,618,140 | 4/1997 | Okland . |
| 5,924,615 * | 7/1999 | McGarrah ........................ 224/561 X |

* cited by examiner

Primary Examiner—Gregory M. Vidovich
(74) Attorney, Agent, or Firm—Price, Heneveld, Cooper, DeWitt & Litton

(57) ABSTRACT

An adjustable bike transport rack is adapted to permit mounting to truck beds of various sizes and includes a cross member with a pair of spaced-apart connectors for securing the cross member to a truck bed. At least one stabilizer arm projects from the cross member for supporting a bike that is positioned in the truck bed during transport. The connectors define a distance therebetween, and the connectors are adjustable relative to one another, such that the distance between the connectors can be varied to permit mounting of the cross member on truck beds of various sizes.

8 Claims, 3 Drawing Sheets

BIKE TRANSPORT RACK

BACKGROUND OF THE INVENTION

The present invention relates to bike transport racks. Such racks are used to transport bicycles or motorbikes on cars, vans and trucks. The rack of the present invention is intended for use on the bed of a pickup truck.

SUMMARY OF THE INVENTION

One aspect of the present invention is an adjustable bike transport rack that is adaptable to permit mounting to truck beds of various sizes. The bike transport rack includes a cross member including a pair spaced-apart connectors for securing the cross member to a truck bed. At least one stabilizer arm projects from the cross member for supporting a bike that is positioned in the truck bed during transport. The connectors define a distance therebetween, and the connectors are adjustable relative to one another, such that the distance between the connectors can be varied to permit mounting of the cross member on truck beds of various sizes.

Another aspect of the present invention is a bike transport rack configured for mounting to openings in an upper edge of the sidewall of a truck bed to support bikes during transport thereof. The bike transport rack includes a cross member, and at least one stabilizer connected to the cross member and positioned to support a bike in a truck bed during transport. A pair of connectors are mounted to the cross member. Each connector includes an elastomeric member shaped for reception within openings in an upper edge of a sidewall of a truck bed, and an expander interconnected with each elastomeric member and expandably deforming the same to tightly engage and secure the elastomeric member within the openings.

Another aspect of the present invention is a bike transport rack for mounting to openings in an upper edge of the sidewalls of a truck bed for supporting bikes during transport. The bike transport rack includes a cross member including a pair of spaced-apart connectors that secure the cross member to openings in an upper edge of a sidewall of a truck bed. At least one stabilizer is connected to the cross member and positioned to support a bike during transport thereof. The cross member telescopingly and selectively varies the spacing between the connectors, enabling attachment of the bike transport rack to differently sized truck beds.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
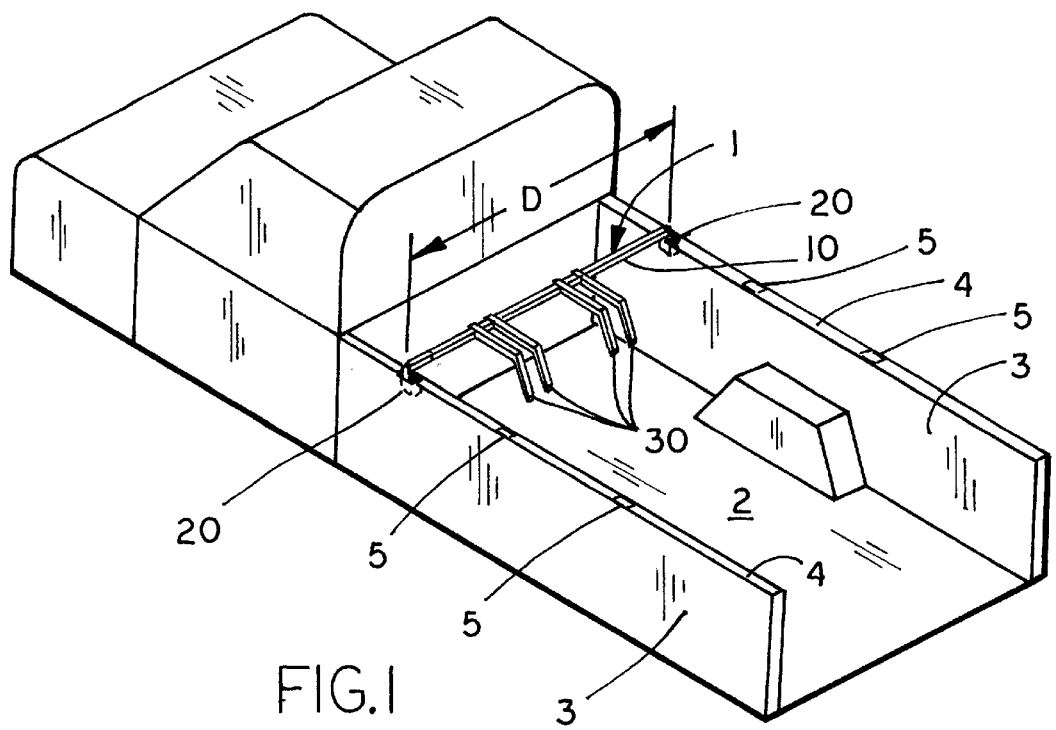
FIG. 1 is a partially schematic perspective view of a truck bed with a preferred embodiment of the bike rack mounted therein.

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, step sequences, processing parameters, and other physical characteristics relating to the embodiments disclosed herein are not to be considered as limiting, unless the claims expressly state otherwise.

The adjustable bike transport rack 1 (FIG. 1) of the present invention is particularly designed to securely transport bikes, motorcycles, and the like in a truck bed 2. The bike transport rack 1 includes a cross member, such as telescoping crossbar 10. Crossbar 10 includes a pair of spaced-apart connectors, such as truck mounts 20 for securing the crossbar 10 to the truck bed 2. At least one stabilizer arm 30 projects from the crossbar 10 for supporting a bike (not shown) that is positioned in the truck bed 2 during transport. The connectors 20 define a distance "D" therebetween corresponding to the distance between a pair of openings 5 in the upper edge 4 of the sidewalls 3 of the truck bed 2. The connectors 20 are adjustable relative to one another, such that the distance "D" can be varied to permit mounting of the cross member 10 on truck beds 2 of various sizes.

Telescoping crossbar 10 includes a truck mount 20 fitted to each end thereof for securing crossbar 10 to a truck bed. A plurality of stabilizer arms 30 are adjustably secured to the crossbar 10 and project therefrom and receive the front wheels of bicycles or motorbikes between an adjacent pair of the stabilizer arms 30. As illustrated in FIG. 1, a pickup truck bed 2 includes sidewalls 3 with an upper edge 4 having one or more openings 5 therein. In accordance with the present invention, the distance "D" between connectors 20 can be varied to permit attachment of the bike transport rack 1 to various sizes of truck beds 2 having different distances between a pair of openings 5 on sidewalls 3.

Figure 3:
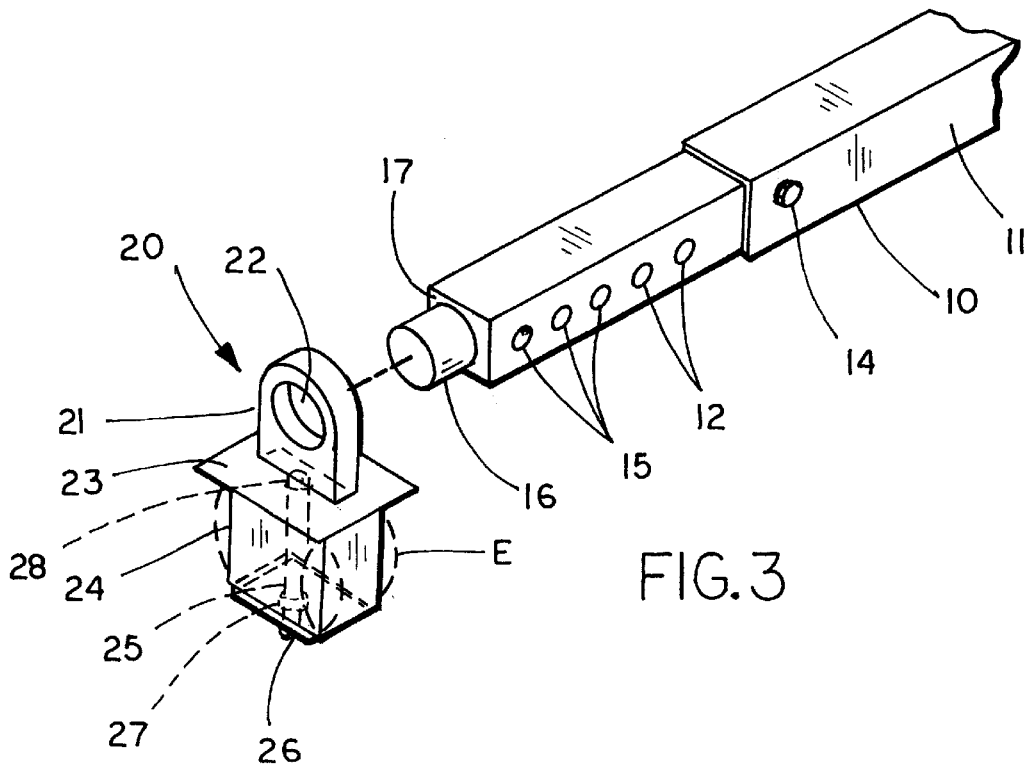
FIG. 3 is a fragmentary view of the end of the crossbar of FIG. 1.
Figure 2:
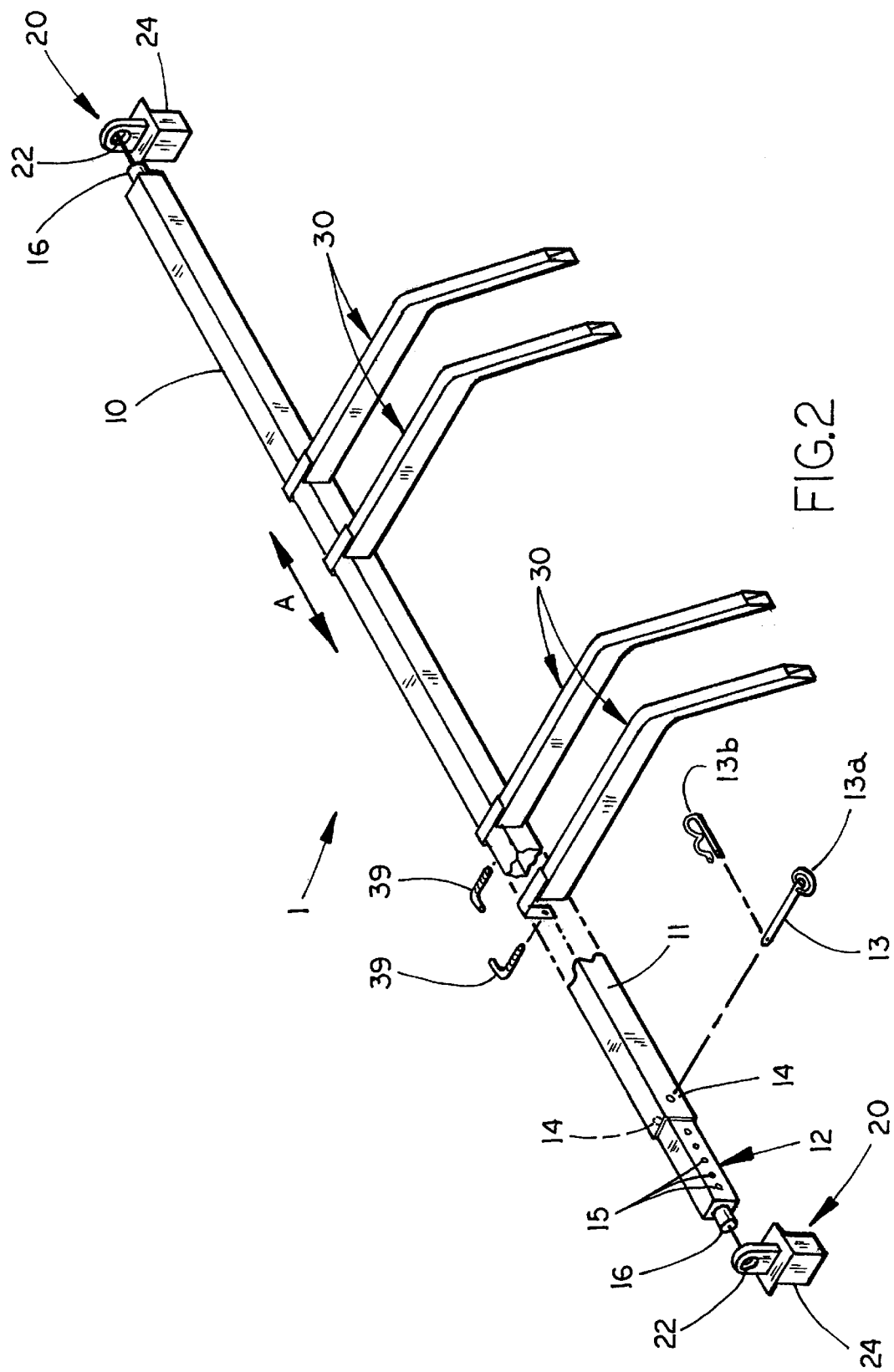
FIG. 2 is a fragmentary perspective view of the bike rack of FIG. 1.

With reference to FIGS. 2 and 3, telescoping crossbar 10 comprises a first, or outer tube 11 of square cross section with a second, or inner tube 12 of slightly smaller square cross section telescopically positioned within outer tube 11. Tubes 11 and 12 may be constructed of steel, aluminum or other suitable material. A lock pin 13 passes through the holes 14 in the end of the first, larger tube 11, and through any of a series of spaced holes 15 in inner tube 12 to lock telescoping cross bar 10 in a length which is approximately equal to the width of the truck bed to which the bike transport rack 1 is being secured. Securing ring 13a and clip 13b retain pin 13 in place once crossbar 10 is properly adjusted for mounting to a truck bed 2.

Preferably, the larger outer tube 11 has a length that is just a bit shorter than the width of the smallest truck bed to which crossbar 10 might be mounted. This helps to insure that the projecting stabilizer arms 30 will always be secured to the stronger, larger diameter outer tube 11. However, if necessary, one or more support arms 30 could be secured to the smaller diameter tube 12 of crossbar 10. Tubes 11 and 12 are made of material and wall thickness which is sufficiently strong that they can carry the load imposed on them when supporting a bicycle, motorbike or motorcycle positioned between a pair of support arms 30 and strapped to crossbar 10.

With reference to FIG. 3, tube 12 includes a pin 16 that is welded or otherwise secured to the end portion 17 of tube 12.

Connectors 20 include a plate 23 and a generally flat upwardly extending support 21 having an opening 22 therethrough that receives pin 16 for support of the telescoping crossbar 10. A threaded member 25 is connected to support 21 and extends downwardly through opening 28 in an elastomeric rubber block 24. The threaded member 25 threadingly engages a nut or other threaded member 27 on a lower plate 26. During installation, the rubber block 24 is inserted into an opening 5 of a truck bed 2, and support 21 and plate 23 are rotated relative to the lower plate 26. Threaded member 25 is thereby rotated through threaded member 27, drawing lower plate 26 upwardly, and causing rubber block 24 to deform and expand outwardly to the position "E"(FIG. 3). Support 21 is then rotated until opening 22 is in alignment with pin 16. The outward expansion of rubber block 24 causes the rubber block 24 to become tightly wedged within opening 5. After the connectors 20 are installed in a pair of openings 5 in a truck bed 2, the pins 16 (see also FIG. 2) are then inserted into the openings 22, and lock pin 13 is inserted through the holes 14 and to secure telescoping crossbar 10 at the desired length for the truck bed 2.

Figure 4:
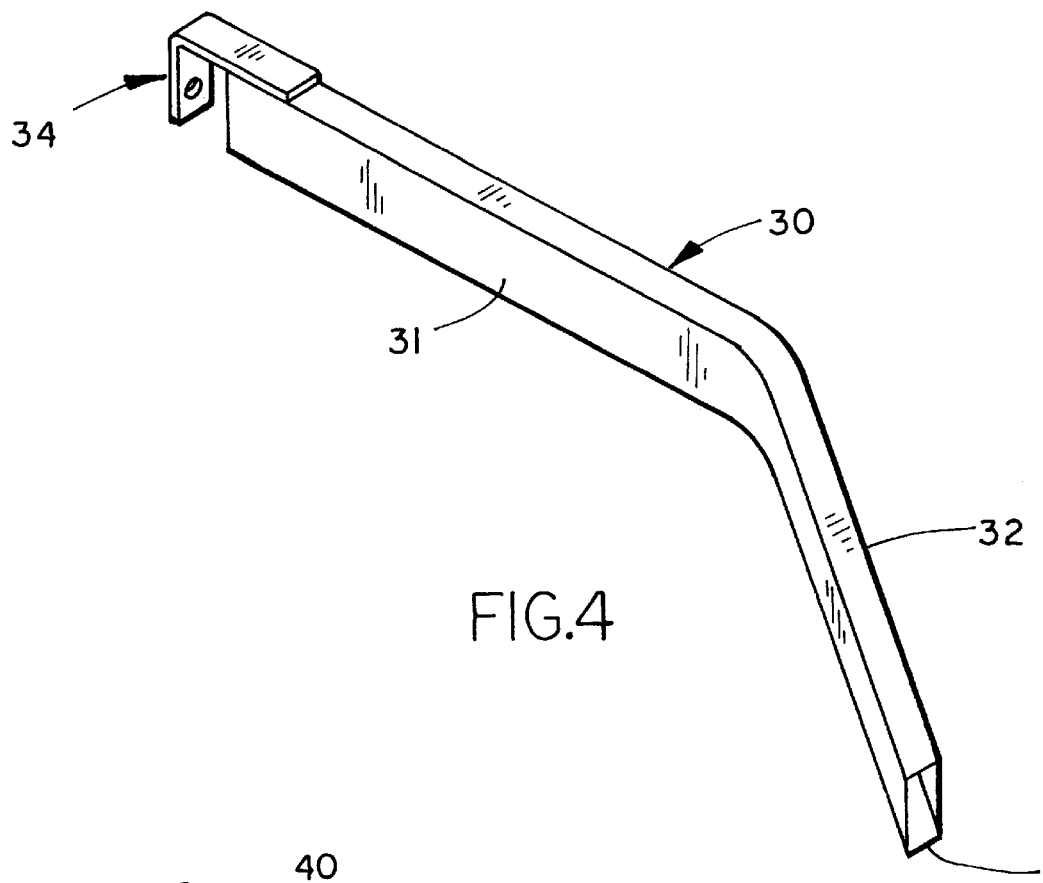
FIG. 4 is a perspective view of an adjustable stabilizer arm of FIG. 1.

With further reference to FIG. 4, each stabilizer arm 30 has a tubular construction, and includes a generally horizontal upper section 31 that extends away from crossbar 10 in a transverse direction when in the installed position. Each stabilizer arm 30 also includes a downwardly and angularly extending portion 32 having a lower, or base portion 33. If required for a particular application, the dimensions of the stabilizer arm 30 can be chosen such that base 33 abuts the truck bed 2 to provide support for the stabilizer arm 30.

Figure 5:
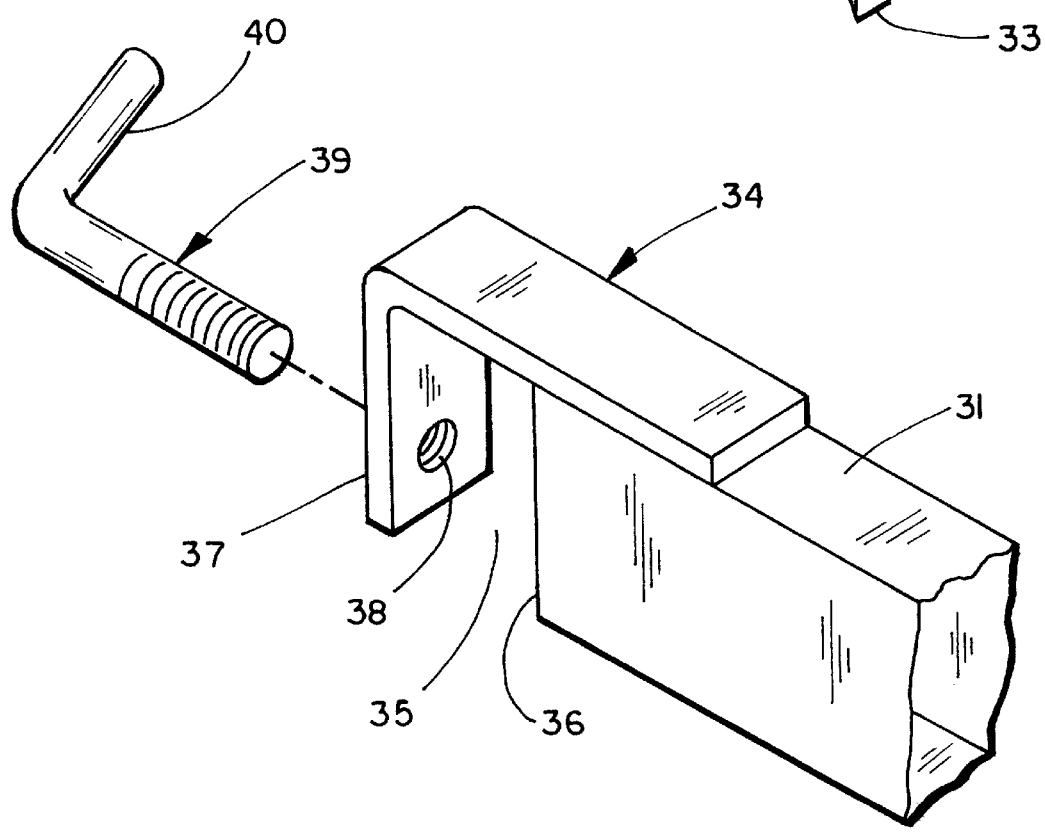
FIG. 5 is a fragmentary perspective view of the upper end of a stabilizer arm of FIG. 4.

With further reference to FIG. 5, each stabilizer arm 30 includes an L-shaped connector 34 that is welded, or otherwise secured to the end of the horizontal upper section 31. Connector 34 and end 36 of horizontal section 31 together define a generally U-shaped downwardly opening portion 35 that fits over telescoping crossbar 10 when arm 30 is in the installed position. Downwardly extending end flange or wall 37 of connector 34 has a threaded opening 38 therethrough that receives a threaded member 39. Threaded member 39 is L-shaped defining a handle portion 40, such that a user can manually grasp the handle 40 of threaded member 39 during installation. Prior to tightening of the threaded member 39, stabilizer arm 30 can be translated along the telescoping crossbar 10 in the direction of the arrow "A" (FIG. 2). After placing stabilizer arm 30 in a selected position, handle 40 of threaded member 39 is grasped, and threaded member 39 is tightened into contact with crossbar 10. Stabilizer arm 30 is thereby securely clamped to the telescoping crossbar 10 in the selected position.

The bike transport rack of the present invention can be quickly and easily secured to truck beds of various sizes. One or more stabilizer arms 30 are secured to the telescoping crossbar in selected positions to stably support a bicycle, motorcycle, or other vehicle in position during transport.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. An adjustable bike transport rack adaptable to permit mounting to truck beds of various sizes, said bike transport rack comprising:

a cross member including a pair of spaced-apart connectors for securing said cross member to a truck bed;

at least one stabilizer arm projecting from said cross member for supporting a bike that is positioned in the truck bed during transport, said stabilizer arm having a first elongated portion extending generally horizontally from said cross member and an elongated end portion that extends downwardly from said first portion, said end portion rigidly joined with said first portion at a location horizontally spaced-apart from said cross member;

said connectors defining a distance therebetween, and wherein said connectors are adjustable relative to one another such that said distance can be varied to permit mounting of said cross member on truck beds of various sizes;

said end portion of said stabilizer arm extends outwardly and downwardly, and includes a base configured to abut the truck bed when said adjustable bike transport rack is installed to an associated truck bed, said end portion of said stabilizer arm having sufficient size to extend from a height of a truck bed sidewall to a floor of the truck bed;

said connectors include resilient blocks sized for reception within openings in an upper edge of the sidewall of a truck bed; and a clamp expanding said resilient blocks and adapted to tightly secure said resilient blocks within said openings.

2. A bike transport rack configured for mounting to openings in an upper edge of the sidewalls of a truck bed to support bikes during transport, said bike transport rack comprising:

a telescopically adjustable cross member having pins extending from opposite ends thereof;

at least one stabilizer connected to said cross member and positioned to support a bike in a truck bed during transport;

a pair of connectors mounted to said cross member, each connector including:

an upwardly-extending projection having an opening therein that receives one of said pins of said cross member to thereby retain said cross member;

an elastomeric member shaped for reception within openings in an upper edge of a sidewall of a truck bed; and an expander interconnected with each said elastomeric member and expandably deforming the same to tightly engage and secure said elastomeric member within said openings.

3. The bike transport rack of claim 2, wherein:

said stabilizer projects outwardly from said cross member, and includes a base for supporting said stabilizer when installed to a truck bed.

4. The bike transport rack of claim 3, wherein:

said expanders include a clamp that compress said elastomeric members in a first direction and expands said elastomeric members in a second direction to thereby secure said elastomeric members within said openings.

5. The bike transport rack of claim 5, wherein:

said clamp includes a threaded member extending through said elastomeric member and compressing the same upon rotation of said threaded member.

6. A bike transport rack for mounting to openings in an upper edge of the sidewalls of a truck bed for supporting bikes during transport, said bike transport rack comprising:

a cross member including a pair of spaced-apart connectors for securing said cross member to openings in an upper edge of a sidewall of a truck bed, said cross member telescoping and selectively varying the spacing between said connectors, enabling attachment of said bike transport rack to differently sized truck beds, said cross member including an outer member and an inner member telescopically received therein for adjustment of the spacing between said connectors to account for truck beds of different sizes;

each said connector including a resilient block and a clamp that selectively deforms said resilient block and outwardly expands said resilient block into tight abutting contact with the inner surface of an opening in said truck bed to thereby secure said cross member to the truck bed;

a first stabilizer connected to said cross member and positioned to support a bike during transport thereof, said first stabilizer extending transversely from said cross member, and also extending downwardly and including a base supporting said first stabilizer when said bike transport rack is installed on a truck bed;

a second stabilizer horizontally spaced-apart from said first stabilizer to define a bike-receiving space therebetween;

said inner and outer members of said cross member each including a pin extending from an end thereof;

said connectors including an upwardly projecting extension having an opening therein; and said pins received within said openings and supporting said cross member across the truck bed.

7. A bike transport rack of claim 6, wherein:

said inner and outer members of said cross member have a tubular construction with a generally quadrilateral cross section.

8. A bike transport rack of claim 7, wherein:

said stabilizers each have a horizontally extending upper portion, and a lower portion extending downwardly and horizontally from said upper portion at an angle thereto.

* * * * *